Aug. 27, 1935. F. W. GUNN 2,012,562
CLASP FOR PARALLEL HOSE MEMBERS
Filed Jan. 25, 1934
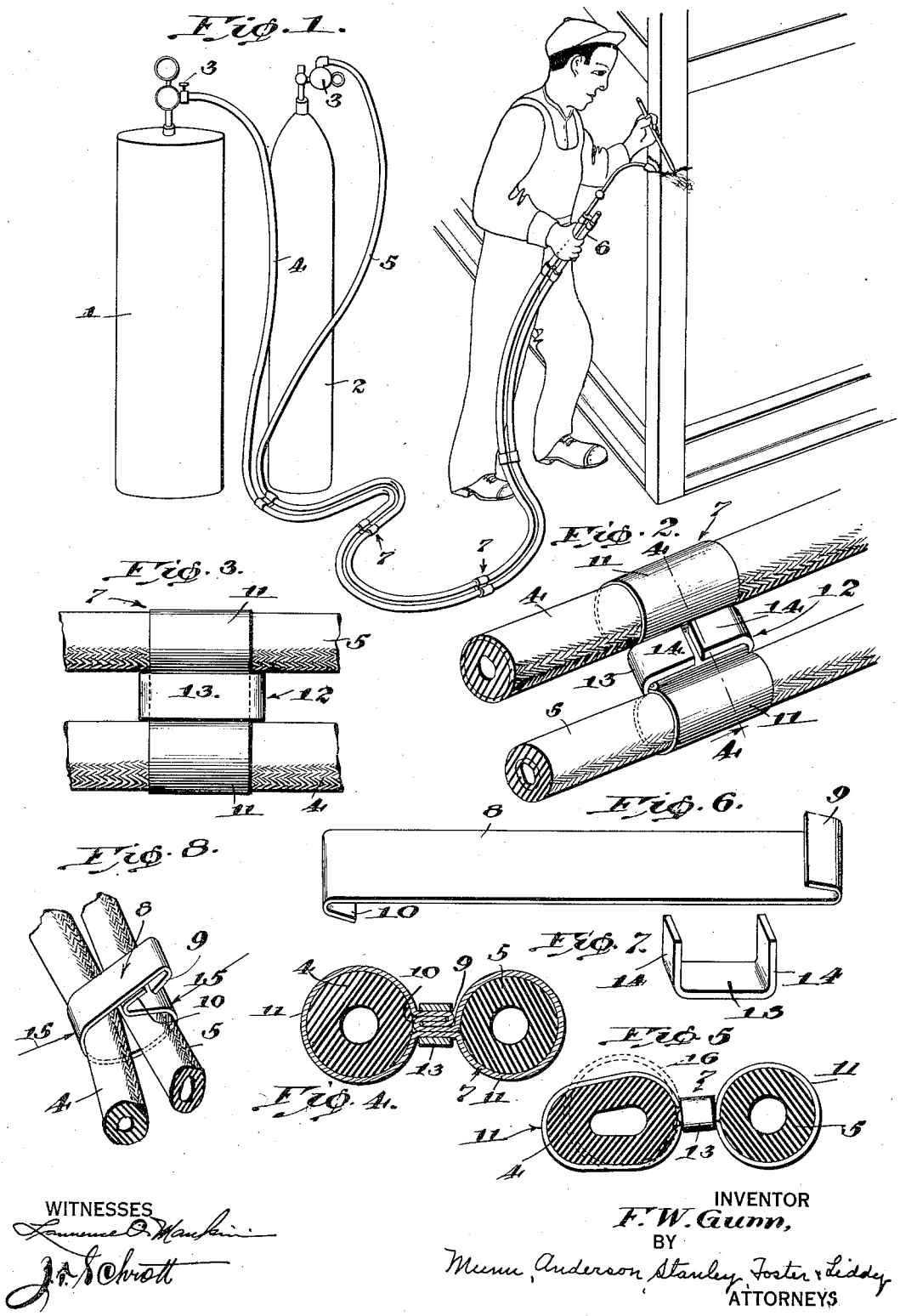

Patented Aug. 27, 1935

2,012,562

UNITED STATES PATENT OFFICE 2,012,562

CLASP FOR PARALLEL HOSE MEMBERS

Fred W. Gunn, Boston, Mass.

Application January 25, 1934, Serial No. 708,304

12 Claims. (Cl. 24—81)

This invention relates to improvements in clasps and the like, and its objects are as follow:—

First, to embrace the combination of a malleable band and at least one resilient hose member (in practice usually two hose members), the band having securing means for affixing it to the hose member, the resiliency of the latter being depended upon to return the band to its original shape or substantially so, when crushed as by being stepped upon, for which purpose the band is made malleable as aforesaid.

Second, to combine a zinc, aluminum or other malleable metal band with a pair of rubber or similarly flexible hose members, there being securing means to fix the ends of the band together at a point between the hose members so as to rigidly space them apart, said securing means being well within the boundaries of the band between the hose members so that there is absolutely no projection of any kind to catch on obstructions and cause trouble.

Third, to combine a yieldable band of non-inflammable material with a pair of rubber hose members, and to squeeze the band together at a place between the hose members to make a rigid bridge, which, however, does not interfere with those parts of the band that go around the hose members insofar as their return to normal position by the natural resiliency of the hose members is concerned after these parts may have been stepped upon or otherwise crushed.

Fourth, to provide connecting means to join two hose members in fixed parallelism at least at one point in the hose line, said connecting means usually consisting of a malleable band and a rigid clip, each bent at its ends to enable quick installation as presently brought out.

Fifth, to provide connecting means which can be adapted to suspending a power cable from an overhead supporting wire.

In the drawing:—

Figure 1 is a perspective view illustrating the use of the clasp in holding the parallel hose members of a gas welding outfit in parallelism.

Figure 2 is a perspective view showing the clasp more in detail.

Figure 3 is a plan view showing how the clasp appears on the side opposite from that in Figure 2.

Figure 4 is a cross section taken on the line 4—4 of Figure 2.

Figure 5 is a partially sectional and elevational view, especially intended to show how the encircling part of the clasp will be returned to its normal shape when the crushing pressure is removed, this by virtue of the resiliency of the hose member acting against the malleability of the clasp.

Figure 6 is a perspective view of the malleable band.

Figure 7 is a perspective view of the rigid clip.

Figure 8 is a detail perspective view illustrating the first step in applying the band.

The invention is primarily intended for use in connection with gas welding outfits. Figure 1 illustrates one kind of such an outfit of which I may be considered the compressed acetylene gas tank and 2 the oxygen tank. These tanks might contain any other fluids, the two mentioned merely serving as an illustration. Each tank has a suitable control 3 at the top, and a pair of hose members 4, 5 lead off to the blow pipe or torch 6 in the hands of the workman.

Generally outfits such as this are equipped with 50′ lengths (more or less) of hose, the members of which are bound together at frequent intervals with wrappings of ordinary bicycle tape. This tape wears and frays very rapidly because of being dragged over the floor, so that the bindings have to be renewed quite often, any one not lasting more than two or three weeks.

The foregoing tape naturally binds the hose members closely together at the points where it is applied, and this produces pockets, in a sense, in which material, often molten, can lodge. The tape itself is objectionable because of its inflammability, and in the event of the tape catching fire there is danger of one or the other hose member being burnt through with a consequent danger to life and property.

The improved clasp is intended to overcome all of the existing disadvantages of bicycle tape and to add others which are brought out below. First of all consider the construction. The clasp, generally designated 7, consists of a malleable band 8 (Fig. 6) which has its ends 9, 10 reversely bent over upon itself so as to form oppositely directed hooks which are intended to interlock (Fig. 4), or at least to make such an interconnection that will prevent pulling apart during any ordinary use.

In specifying a malleable band a band of zinc, aluminum or similar pliable metal is meant. The band is easily worked with the fingers during initially fitting at around the hose members 4, 5 as pictured in Figure 8. These hose members are usually made of rubber, but they should be understood as consisting of any other resilient material. It is here that the combination enters because the resiliency of the hose members is depended upon to restore the encircling parts 11 of the clasp to their original position (Fig. 5) after some crushing force has been removed such as would occur when stepping upon the clasp while on the floor.

Securing means 12 affixes the band 8 to the hose members 4, 5 by clamping the interlock 9, 10 in the medial position of the clasp between said hose members. This securing means consists of a rigid clip 13 (Fig. 7), the ends 14 of which are intended to be bent over as shown in Figure 2. The securing means 12 presses down on the interlock 9, 10 so tightly that said securing means comes well within the boundaries of the band between the hose members. This insures the avoidance of absolutely any projection from the securing means that may either catch on an obstruction or tear the hands of the workman.

The advantages of the clasp are set out as follows: The encircling parts 11 do not cut into the hose members as would wire and the like. The clasp is applied rather tightly; so tightly that the hose members will neither slip nor turn, but they do not press into the surface of the hose members to any noticeable extent. The thickness of the band 8 is not great enough to make any noticeable edge, so that one can slide his hand up and down the hose line around the clasp and not meet any appreciable obstruction.

The clip 13, together with the interlock 9, 10 which it squeezes together, makes a rigid bridge which spaces the hose members 4, 5 a definite distance part. This spacing is highly desirable because should any molten metal or red hot fragments of metal fall on the hose line it will tend to drop through the space and therefore greatly minimize the danger of burning through. The clasp itself is not inflammable, as is obvious from the metal structure of its constituents. While the so-called bridge is perfectly rigid yet this rigidity does not interfere with the free resilient action of the hose members in returning the encircling parts 11 to normal position after crushing.

The mode of application of the clasp is as follows:—Malleable bands 8 and clips 13 are made up in advance in the forms shown in Figures 6 and 7, or substantially of those forms. First take a band 8 and wrap it around the hose members 4, 5 in the manner suggested by Figure 8. The sides will have to be pressed in as denoted by the arrows 15 sufficiently far to enable interconnecting the hook ends 9, 10 so that the band is converted into a loop. It must be understood that the mode of interconnection by hooks is not necessarily adhered to.

The ends of the band may be connected in any way desired. They might be soldered together if the material of the band is such as to lend itself to soldering. However, simplicity and speed of application make the hook interconnection the preferable mode, thereupon the interconnection can be flattened somewhat merely by finger pressure.

In practice an anvil and a so-called "set" are used to complete the joint, the set being on the order of a very blunt cold chisel. The anvil includes an upstanding part that preserves the spacing between the hose members and at the same time provides a rest for the middle part of the clasp. The clip 13 is put in place under the middle part and laid on the rest, its ends 14 extending upward.

The middle part is then further pressed together by a hammer blow on the set which has been applied to said middle part where exposed before the upstanding ends 14. Each of the ends 14 is then given a clip with the hammer so that they are bent inwardly (Fig. 2), the set then being used again to finish the job. All of the operations of applying the clasp can be gone through very quickly, a person with a little practice being able to make a complete installation in approximately thirty-five seconds.

Figure 5, already touched upon, is intended to illustrate what is regarded as the most important feature of the invention, namely the return of the malleable band to normal position by the natural resiliency of the hose member after the crushing force is removed. The hose member 4 is supposed to be under a crushing force in the full line position, for example such as would occur when the hose line is stepped upon. As soon as the crushing force is removed the deformed encircling part 11 returns to its normal round shape as designated at 16 in dotted lines.

It is contemplated to use the clasp for purposes other than the ones specified above. Its simple construction and ease of application prompts its use wherever two members are intended to be fastened together easily and quickly in spaced parallelism. To this end a power cable can be suspended from an overhead supporting wire.

A still further modification both in the nature of the clasp and its mode of application is this: Still consider the band 8 as of malleable material, the final act of its application may consist of the interconnection of its ends as in Figure 8, whether the interconnecting means comprises the ends 9, 10 or solder or the like. After the loop is completed its medial part can be squeezed together between the resilient members, and the act of applying stopped there. The clasp thus constituted is not as good as when the clip 13 is attached, but it will do for many purposes wherein two members are intended to be held in the spaced parallelism.

Going still farther, the primarily thin band 8 can be substituted by a band materially thicker. Malleability disappears as thickness increases. A band of such a nature can simply be looped around and pressed together in its medial part, the clip 13 again being omitted, and by virtue of its superior thickness made to more rigidly clasp than contemplated at the beginning of this description.

I claim:—

1. The combination of two resilient hose members, and a band embracing said members so as to hold them together, said band being composed of malleable material and said members being of sufficient resiliency to overcome the resiliency of the band and return those parts of the band in contact with the hose to normal position when a crushing force is removed.

2. The combination of two resilient hose members, a malleable band encircling said members so as to hold them together, and securing means for the medial parts of the band, making a rigid bridge between the hose members to space them apart, the malleability of the band and the resiliency of said members relatively being such as to insure the return of its encircling parts to normal position when a crushing force is removed.

3. The combination of two resilient hose members, a malleable band applied around the hose members in an embracing position to hold said members together, the ends of the band being connected to each other to convert the band into a loop, and a rigid clasp securing the medial parts of the band together in a squeezed together position between the hose members making a rigid bridge which keeps said members separate.

4. The combination of two resilient members, a malleable loop embracing said members so as to tie them together, and rigid securing means holding the medial parts of the loop pressed together between said members to form a separating bridge.

5. The combination of two resilient members, a malleable loop embracing said members so as to tie them together, and a rigid clip applied around the medial part of the loop, the ends of the clip being battered down upon said medial part and said clip composing a rigid metal bridge spacing said members apart.

6. The combination of a pair of resilient members, a malleable loop going around said members to tie them together in parallelism, the medial part of the loop being squeezed together in close contact between said members, and a clip of rigid material applied around said squeezed together part, the through and through dimension of the clip and squeezed together part being less than the size of said members.

7. The combination of a pair of resilient members, a malleable band having reversely bent ends forming oppositely directed hooks, said band being applied around the said members in loop form with the hooks interlocking between said members, the loop being pressed together at the medial part between said members, and a clip of rigid material applied to the medial part in the direction of said members and having its ends bent over and battered down upon said medial part to make a rigid interconnecting bridge which spaces said members apart.

8. A clasp for parallel members comprising a band having formations at its opposite ends interconnected to convert the band into a loop around said members, and a clip of rigid material tightly gripping the band at the point of interconnection of said formations.

9. A clasp for parallel members comprising a band having formations at its opposite ends interconnected to convert the band into a loop around said members, and a clip of rigid material tightly gripping the latter in tightly squeezed together position between said members.

10. A clasp for parallel members comprising a band having formations at its opposite ends interconnected to convert the band into a loop around said members, and a clip of rigid material tightly gripping the loop in squeezed together position at said formations between said members.

11. A clasp for connecting two members in parallelism, said members being subject to dragging over a floor, comprising a single band to be applied around said members in loop form and having means at its ends for making a fixed interconnection solely within the boundaries of the band so as to avoid any projection capable of catching on an obstruction.

12. A clasp for connecting two members in parallelism, said members being subject to frequent handling by a workman, comprising a single band secured around said members, the medial parts of the band being squeezed together in the space between the said members so as to lie solely within the boundaries of said members and thereby avoid any projection likely to tear the hands of the workman.

FRED W. GUNN.